Figure 2:
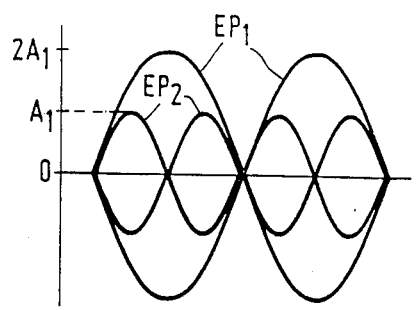

United States Patent [19]

Horsten

[11] Patent Number: 4,853,801
[45] Date of Patent: Aug. 1, 1989

[54] DEVICE FOR REGENERATING A BINARY DIGITAL SIGNAL, FOR EXAMPLE A BI-PHASE ENCODED SIGNAL

[75] Inventor: Johannes B. Horsten, Eindhoven, Netherlands

[73] Assignee: U.S. Philips Corporation, New York, N.Y.

[21] Appl. No.: 61,232

[22] Filed: Jun. 10, 1987

[30] Foreign Application Priority Data

Jun. 11, 1986 [NL] Netherlands ............................ 8601514
Oct. 8, 1986 [NL] Netherlands ............................ 8602517

[51] Int. Cl.$^4$ .................................................. G11B 5/09
[52] U.S. Cl. ...................................................... 360/46
[58] Field of Search ........................ 360/46, 67; 369/59

[56] References Cited

U.S. PATENT DOCUMENTS 4,622,599 11/1986 Norrow, Jr. ............................ 360/46

Primary Examiner—Vincent P. Canney
Attorney, Agent, or Firm—Thomas A. Briody; Jack E. Haken; Anne E. Barschall

[57] ABSTRACT

The device comprises an input terminal (1) for receiving an electric signal and an output terminal (2) for supplying the binary digital signal. The input terminal (1) is coupled to the output terminal (2) via an equalizing unit (3) and a limiter circuit (7). The output (5) of the equalizing unit (3) is coupled to a first point of constant potential (16) via a clipper circuit (20). The output (8) of the limiter circuit (7) is coupled to the input (6) via an impedance (23). Further, the input (6) is coupled to a second point of constant potential (earth) via an integrating element (24). FIG. 1.

23 Claims, 2 Drawing Sheets

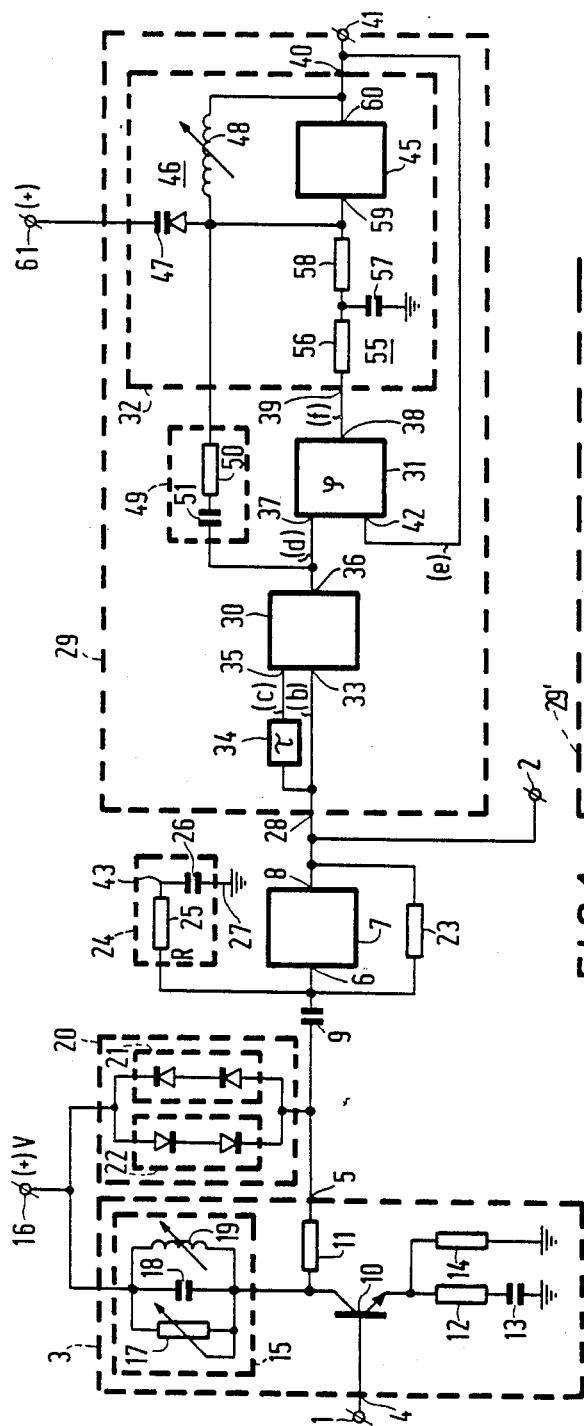
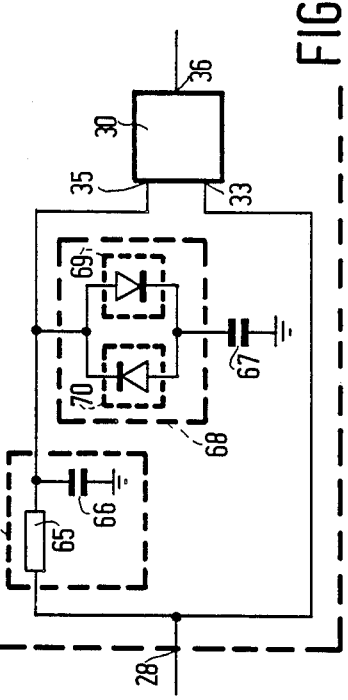
FIG.1
FIG.6 a b a
b
c
d
$f_{osc}$ e
f

DEVICE FOR REGENERATING A BINARY DIGITAL SIGNAL, FOR EXAMPLE A BI-PHASE ENCODED SIGNAL

The invention relates to a device for regenerating a binary digital signal, for example a bi-phase encoded signal, from an electric signal read from a transmission channel, for example in the form of a track on a record carrier. The device has an input terminal for receiving the electric signal. The input terminal is coupled to an input of an equalising unit, of which an output is coupled to an input of a limiter circuit, of which an output is coupled to an output terminal for supplying the bi-phase encoded signal. Such a device may be incorporated in, for example, a video recorder. The input terminal of the device is then coupled to one or more read heads situated on a rotary head drum via switching means and the output terminal is then coupled to a demodulator. The device is intended for reducing the distortion of a digital signal. Such distortion arises after recording the signal and subsequently reading it from the record carrier, to render the signal suitable for demodulation in the demodulator.

However, even with use of the above-described device the digital signal of the device frequently contains a substantial distortion component.

It is an object of the invention to provide structures which enable a binary digital signal to be regenerated with a smaller distortion component. To this end the device in accordance with the invention is characterized by any one or both of the following structures:

(a) the device further comprises a clipper circuit coupled between the output of the equalising unit and a first point of constant potential, (b) the output of the limiter circuit is coupled to its input via an impedance and this input is further coupled to a second point of constant potential via an integrating element.

The invention is based on the recognition of the that, as a result amplitude variations in the input signal of the device, the signal in the equalising unit may be limited against the supply volume. This is because the equalising unit generally comprises an amplifier which provides frequency-dependent amplification of the signal which exhibits amplitude variations. This means that the amplitude variations are also larger, so that the probability of the signal in the equalising unit being limited against the supply voltage of this unit increases. This may result in asymmetry in the eye pattern of the output signal of the equalising unit, causing a change in the switching voltage at which the limiter circuit must be switched over. The limiter circuit is then no longer switched over at the correct instant, so that the limiter circuit supplies a severely distorted digital signal. Moreover, the amplitude variations in the input signal may result in the permissible input voltage of the limiter circuit being exceeded. This also leads to the limiter circuit being switched at an incorrect voltage, so that this circuit also produces a highly distorted digital signal.

Although the foregoing only refers to a binary digital signal and the invention in general relates to devices for regenerating such a signal, the following description will concentrate on the regeneration of a digital signal in the form of a bi-phase encoded signal.

Structure (a) ensures that in the limiter circuit no signal amplitudes (can) occur which result in limiting against the supply voltage of the equaliser and also ensures that on the input of the limiter circuit no signal amplitudes (can) occur which can exceed the permissible input voltage of the limiter circuit.

In the case of excessive signal amplitudes on the input of the equalising unit the clipper circuit clips the peaks in the eye pattern. This results in the aforementioned advantage and has no adverse effect because the information in the eye pattern is not situated in the peaks of the eye pattern, but in the zero crossings of the bi-phase encoded signal in the eye pattern. The clipper circuit does not affect these zero crossings.

It follows from the foregoing that the clipper circuit should clip at such a voltage that both the supply voltage of the equalising unit is not yet reached and the maximum permissible input voltage at the input of the limiter circuit is not yet reached.

Structure (b) ensures that during the time that no signal is applied to the input of the limiter circuit the limiter circuit oscillates and across the integrating element a direct voltage is produced which is exactly equal to the switching voltage of the limiter circuit.

In this respect it is to be noted that U.S. Pat. No. 4,499,570 also describes a limiter circuit in which the switching voltage is generated automatically by means of feedback. However, this construction is different. For example, no oscillation occurs in the absence of an input signal.

The clipper circuit used in accordance with step (a) may comprise two diode-means arranged in anti-parallel, one diode means comprising, for example, one (or a plurality of series-connected) diode(s), depending on the voltage at which the clipper circuit is required to start clipping.

The impedance arranged between the output and the input of the limiter circuit in accordance with step (b) may be a resistor and the integrating element may comprise, for example, a series arrangement of a resistor and a capacitor.

Further, the device in accordance with the invention may comprise a unit for regenerating a clock signal from the bi-phase encoded output signal of the limiter circuit. Such a unit is necessary because the clock signal derived by means of this unit is required for demodulating the bi-phase encoded signal in the aforementioned demodulator connected to the output of the limiter circuit.

Such a device in accordance with the invention, provided with a unit for regenerating a clock signal, may be characterized further in that the unit for regenerating a clock signal comprises a slope detector, a phase comparator and a voltage-controlled oscillator, in that the output of the limiter circuit is coupled to a first input and, via a delay means, to a second input of the slope detector, an output of the slope detector being coupled to a first input of the phase comparator, which has an output coupled to a control input of the voltage-controlled oscillator, of which an output is coupled both to a second input of the phase-comparator and to an output of the device for regenerating a clock signal.

The device may be characterized further in that the voltage-controlled oscillator comprises an inverting amplifier and an LC circuit, and in that the output of the slope detector is coupled to the LC circuit via a second impedance. The second impedance may be a series arrangement of a resistor and a capacitor. In this way it is achieved that the voltage-controlled oscillator more rapidly adjusts itself to the correct frequency of the clock signal. Moreover, this extends the frequency range within which the voltage-controlled oscillator is still capable of tracking the frequency applied to the input of the unit for regenerating a clock signal.

The device comprising the unit for regenerating a clock signal from the output signal of the limiter circuit may be characterized further in that a series arrangement of a capacitor and a second clipper circuit is arranged between the second input of the slope detector and the second point of constant potential. The second clipper circuit may comprise two diode-means arranged in anti-parallel, each diode means comprising one (or a plurality of series-connected) diode(s).

These steps are of particular importance if the delay unit preceding the second input of the slope detector is a non-ideal delay line. This is the case, for example, if the delay unit is constructed as an RC network, the resistor R being arranged between the output of the limiter circuit and the second input of the slope detector and the capacitor C being arranged between said second input and the second point of constant potential.

These steps ensure that for determining the delay time no lengthy and accurate adjustments are necessary, yet guaranteeing a satisfactory operation of the slope detector.

Embodiments of the invention will not be described in more detail, by way of example, with reference to the accompanying drawings. In the drawings FIG. 1 shows an embodiment of the device, FIG. 2 shows the eye pattern of the bi-phase encoded signal, FIGS. 3a and b show the signal components of the bi-phase encoded signal as a function of time, FIG. 4 shows the clipped eye pattern of FIG. 2, FIGS. 5a through f show some signals as a function of time, which signals appear at some locations in the unit for regenerating the clock signal, and FIG. 6 shows the input circuit of another example of the unit for regenerating the clock signal.

FIG. 1 shows the device for regenerating a bi-phase encoded signal from an electric signal. This electric signal is applied to the input terminal 1 and the regenerated bi-phase encoded signal is then available on the output terminal 2. The device comprises an equalising unit 3 having an input 4 coupled to the input terminal 1 and an output 5 coupled to an input 6 of a limiter circuit 7 via a decoupling capacitor 9. The output 8 of the limiter circuit 7 is coupled to the output terminal 2.

The equalising unit 3 comprises an amplifier in the form an an npn-transistor 10 coupled between the input 4 and the output 5. For this purpose the input 4 is coupled to the base of the transistor 10 and the collector of the transistor 10 is coupled to the output 5 via a resistor 11. The emitter of the transistor 10 is coupled to a point of constant potential (earth) via a series arrangement of a resistor 12 and a capacitor 13 and via a resistor 14. The resistor 14 determines the d.c. bias of the transistor 10. The resistor 14 in conjunction with the resistor 12 and the capacitor 13 determines the a.c. gain of the transistor 10. Moreover, the collector of the transistor 10 is coupled to another point of constant potential 16 (the positive power-supply terminal) via a tunable filter 15. The tunable filter comprises a parallel arrangement of a variable resistor 17, a capacitor 18 and a variable inductor 19. The amplitude characteristic and the phase characteristic of the filter 15 can be adjusted by varying the value of the resistor 17 and the value of the inductor 19.

The equalising unit 3 is adjusted by adjusting the tunable filter 15. When the equalising unit is adjusted correctly the eye pattern of the bi-phase encoded signal appearing on the output 5 will be as shown in FIG. 2. The eye pattern EP1 corresponds to the signal component of the lower frequency $f_1$, see FIG. 3b, and the eye pattern EP2 corresponds to the signal component of the higher frequency $f_2$, see FIG. 3a, in the bi-phase encoded signal. It is evident from FIG. 3 that $f_2 = 2f_1$.

Figure 3:
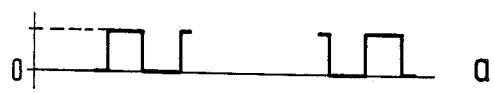
Figure 3:
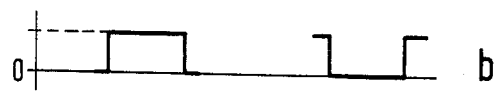
Figure 4:
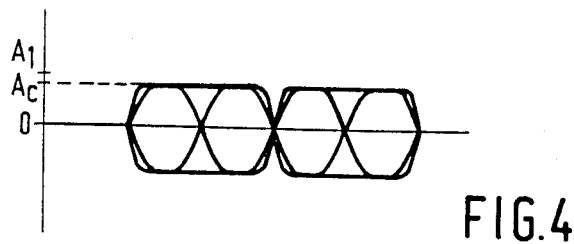

The bi-phase encoded signal comprises consecutive signal patterns as shown in FIGS. 3a and 3b, the signal patterns of FIG. 3a representing, for example, a logic "1" and the signal patterns of FIG. 3 representing a logic "0".

As a result of the recording and reproducing characteristic with which the bi-phase encoded signal is recorded on or read from the record carrier, the signal distorted. Thus instead of a sequence of signal patterns as shown in FIGS. 3a and 3b, strongly distorted signal patterns appear on the input terminal 1, having less steep edges and less sharp transitions, which consequently results in the eye pattern or rather the eye patterns in FIG. 2.

Moreover, on account of the recording and subsequent reproduction, a phase shift arises between the two eye patterns EP1 and EP2. If the equalising unit is adjusted correctly the amplitude of the eye pattern EP1 is twice that of the eye pattern EP2 and the zero crossings of the eye pattern EP1 coincide with every second zero crossing of the eye pattern EP2, as can be seen in FIG. 2.

A clipper circuit 20 is arranged between the output 5 and the (first) point of constant potential 16. The clipper circuit 20 comprises two diode-means 21 and 22 arranged in anti-parallel. Each diode means comprises one (or a plurality of series-connected) diode(s). Alternatively, the clipper circuit 20 may be coupled to earth via a decoupling capacitor. The clipper circuit 20 clips the signal on the output 5 as soon as the amplitude of the signal exceeds the breakdown voltage of the one or more diodes of each diode means. If this voltage ($A_C$) lies below the value $A_1$ in FIG. 2 this results in a clipped eye pattern on the output, as is shown in FIG. 4.

The zero crossings of the two clipped eye patterns are not modified by clipping, which is necessary for the correct operation of the limiter circuit 7. On account of clipping amplitude variations in the input signal, however, have no effect on the limiter circuit 7.

The output 8 of the limiter circuit 7 is coupled to the input 6 via an impedance in the form of a resistor 23. Further, the input 6 is coupled to a (second) point of constant potential 27 (earth) in the form of a series arrangement of a resistor 25 and a capacitor 26. The limiter circuit 7 may comprise, for example, an inverter coupled between the input 6 and the output 8. However, the limiter circuit 7 may also be constructed in another way. An example of this is an exclusive-OR having one input coupled to the input 6, having its other input coupled to the positive power-supply terminal and its output to the output 8.

The limiter circuit 7 operates as follows: In the absence of a signal on the input 6 of the limiter circuit this circuit will oscillate as a result of the feedback via the resistor 23. Now a direct voltage equal to the switching voltage for the limiter circuit 7 is built up across the integrating element 24. If subsequently a bi-phase encoded signal is applied to the input 6 this switching voltage will correspond exactly to the zero crossings in the eye patterns of FIG. 2 or FIG. 4. Consequently, the limiter circuit 7 will change over at the appropriate instants and will produce undistorted signal patterns, as is shown in FIG. 3, which are applied to the output terminal 2.

Further, the output 8 may be coupled to an input 28 of a unit 29 for regenerating a clock signal. Such a unit comprises a slope detector 30, a phase comparator 31, and a voltage-controlled oscillator 32. The input 28 is coupled to a first input 33 and, via a delay means 34, to a second input 35 of the slope detector 30. The output 36 of the slope detector 30 is coupled to a first input 37 of the phase comparator 31, whose output 38 is coupled to the input 39 of the voltage-controlled oscillator 32. The output 40 of the voltage-controlled oscillator 32 is coupled to the output 41 of the unit 29 for supplying the clock signal and is coupled to a second input 42 of the phase comparator 31. Both the slope detector 30 and the phase comparator 31 may comprise, for example, an exclusive-OR.

Figure 5:
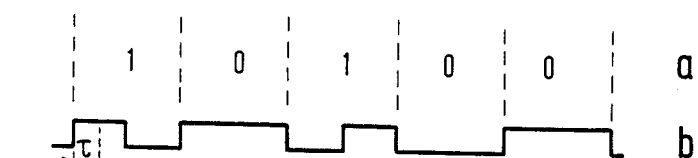

The unit 29 operates as follows. A bi-phase encoded signal, see FIGS. 5a and 5b, is applied to the input 28 of the unit 29 and it reaches the input 33 directly and reaches the input 35 of the slope detector 30 with a delay via the delay means 34. FIG. 5 c shows the delayed signal on the input 35 and FIG. 5d shows the signal on the output 36 of the slope detector 30. In the phase comparator 31 the signal of FIG. 5c is compared with the signal from the oscillator, see FIG. 5e, having a frequency $f_{osc}$. From FIGS. 5b and 5e it appears that $f_{osc} = 2f_2$. The signal on the output 38 of the phase comparator 31 is shown in FIG. 5f. This signal is applied to the input 39 of the voltage-controlled oscillator 32.

The voltage-controlled oscillator 32 comprises an inverting amplifier 45 and an LC circuit 46. The input 39 is coupled to the input 59 of the inverting amplifier 45 via a low-pass filter 55 comprising a resistor 56 and a capacitor 57 and via a resistor 58. The output 60 of the inverting amplifier 45 is coupled to the output 40 of the voltage-controlled oscillator.

The LC circuit 46 comprises an inductor 48 coupled between the input 59 and the output 60 of the inverting amplifier 45 and a variable-capacitance diode (varicap) 47 coupled between the input 59 and the first point of constant potential 61 (the positive power-supply terminal).

The signal of FIG. 5f is applied to the low-pass filter 55. This supplies a d.c. component which is applied to the varicap 47. The varicap 47 is a diode which is poled in the reverse direction and whose capacitance varies depending on the voltage across the diode.

Further, the output 36 of the slope detector 30 is coupled to the LC circuit 46 via an impedance 49 formed by a series arrangement of a resistor 50 and a capacitor 51. In this way it is achieved that the voltage-controlled oscillator 32 adjusts itself more rapidly to the correct frequency for the clock signal. Moreover, this extends the frequenty range within which the voltage-controlled oscillator is still capable of tracking the frequency applied to the input 28.

If the delay means 34 comprises an RC-network, it is found to be necessary to couple the junction point 43 between the resistor 25 and the capacitor 27 to the input 35 via a resistor (not shown). For a correct operation of the slope detector 30 the switching voltage for the limiter must then also be used for determining the threshold value for the slope detector.

FIG. 6 shows the input circuit of another example of the unit for regenerating the clock signal 29'. The delay unit 34 in FIG. 1 is constructed as an RC-network 34' whose resistor 65 is arranged between the input 28 of the unit 29' and the second input 35 of the slope detector 30 whose capacitor 66 is arranged between the input 35 and the second point of constant potential (earth). The delay means 34 of FIG. 1 is now constructed as a non-ideal delay line, the RC time of the RC-network 34' determining the delay $\tau$. Further, the input 35 is coupled to the second point of constant potential (earth) via a series arrangement of a capacitor and a second clipper circuit 68. Again the clipper circuit 68 may comprise two diode means 69 and 70 arranged in anti-parallel, each diode means comprising one (or more series-connected) diode(s).

From FIGS. 5b and 5c it is apparent that the RC time of the network 34' must be selected in such a way that a delay $\tau$ is obtained which is equal to a quarter of the period of the bi-phase encoded signal if the signal comprises only digital "ones". The bi-phase encoded signal is then a pulse-shaped signal of a fixed frequency $f_2$.

The input capacitance of the slope detector 30 may influence the delay provided by the network 34'.

If the RC time of the network 34' has been adjusted correctly, allowance being made for the input capacitance of the detector 30, variations of this input capacitance may result in the delay $\tau$ assuming an entirely different value, which is obviously undesirable.

In order to reduce the influence of this input capacitance on the delay time, the capacitance value of the capacitor 66 may be selected to be very high. However, this gives rise to another disadvantage.

If the capacitor 66 has a high capacitance a sawtooth-shaped signal of a frequency $f_2$ will arise on the input 35 (in the absence of a series arrangement 67, 68), which sawtooth signal is 90° phase-shifted relative to the signal in FIG. 5b (again assuming that the bi-phase encoded signal comprises only digital "ones"). The average value of the sawtooth-shaped signal is the switching voltage for the slope detector 30 at which the output of the slope detector 30 changes over.

However a digital "zero" in the input signal on the input 28 will cause the sawtooth to increase (towards a higher amplitude—as a result of the first "zero", with a positive value, in the signal of FIG. 5b) or to decrease (towards a smaller amplitude—as a result of the second "zero", of opposite value, in the signal of FIG. 5b). In particular in the case that the "zeros" of positive value and the opposite value do not recur at the same rate averaged in time, this will give rise to a deviation in the value of the switching voltage for the slope detector 30, so that this slope detector is no longer changed over at the correct instant. This is undesirable.

By clipping the signal on the input 35 at the level which is situated at or below the maximum value of the sawtooth arising if the bi-phase encoded signal on the input 28 comprises only digital "ones", it is achieved that the switching voltage becomes stabler and is less dependent on signal components of lower frequency (logic "zeros") in the bi-phase encoded signal.

Thus, clipping is effected by means of the clipper circuit 68, the signal level above which clipping is effected being determined by the number of (series-connected) diodes in a diode means 69, 70. The desired switching voltage for the slope detector 70 is produced across the capacitor 67.

In this way it is achieved that no lengthy and accurate adjustment of the capacitance value of the capacitor 66 is required, whilst in addition the slope detector 30 will operate correctly if the period of the input signals varies.

It is to be noted that the invention is not limited to the embodiments described herein. The invention also relates to those embodiments which differ from the embodiments described in the foregoing with respect to points which are not relevant to the invention. This means inter alia that the inventive steps are also applicable to devices which in general are intended for regenerating a binary digital signal.

What is claimed is:

1. A device for regenerating a binary digital signal from an electric signal read from a transmission channel, comprising:
   a. an equalising unit having an input coupled to receive the electric signal and an output;
   b. a limiter circuit having an input coupled to the output of the equalising unit and an output;
   c. an output terminal coupled to the output of the limiter circuit for supplying the regenerated digital signal;
   d. a clipper circuit coupled between the output of the equalising unit and a first point of constant potential;
   e. an impedance which couples the output of the limiter circuit to its input; and
   f. an integrating element which further couples the input of the limiter circuit to a second point of constant potential.

2. A device for regenerating a binary digital signal from an electric signal read from a transmission channel, comprising:
   a. an equalising unit having an input coupled to receive the electric signal and an output;
   b. a limiter circuit having an input coupled to the output of the equalising unit and an output;
   c. an output terminal coupled to the output of the limiter circuit for supplying the regenerated digital signal; and
   d. a clipper circuit coupled between the output of the equalising unit and a point of constant potential.

3. A device for regenerating a binary digital signal from an electric signal read from a transmission channel, comprising:
   a. an equalising unit having an input coupled to receive the electric signal and an output;
   b. a limiter circuit having an input coupled to the output of the equalising unit and an output;
   c. an output terminal coupled to the output of the limiter circuit for supplying the regenerated digital signal;
   d. an impedance which couples the output of the limiter circuit to its input; and
   e. an integrating element which further couples the input of the limiter circuit to a point of constant potential.

4. The device of claim 2, wherein the equalising unit comprises:
   a. a filter coupled between the output of the equalising unit and the point of constant potential; and
   b. an amplifier coupled between the input and the output of the equalising unit.

5. The device of claim 4 wherein the clipper circuit comprises two diode means arranged in anti-parallel.

6. The device of claim 5 wherein at least one of the diode means comprises a diode.

7. The device of claim 5 wherein at least one of the diode means comprises a plurality of series connected diodes.

8. The device of claim 1, 2, or 3 wherein the binary digital signal is a bi-phase encoded signal.

9. The device of claim 1, 2, or 3, wherein the transmission channel is a track on a record carrier.

10. A device as claimed in claim 1 or 2 wherein the clipper circuit comprises two diode means arranged in anti-parallel.

11. A device as claimed in claim 10, wherein at least one of the diode means comprises a diode.

12. The device of claim 10 wherein at least one of the diode means comprises a plurality of series-connected diodes.

13. A device as claimed in claim 1 wherein the first point of constant potential has the same potential as the second point of constant potential.

14. A device as claimed in claim 1 or 13 wherein the equalising unit comprises a filter coupled between the output of the equalising unit and the first point of constant potential, and an amplifier coupled between the input and the output of the equalising unit.

15. A device as claimed in claim 1, 2, or 13, wherein the impedance comprises a resistor.

16. A device as claimed in claim 15, wherein the integrating element comprises a series arrangement of a resistor and a capacitor.

17. The device of claim 16, further comprising a unit for regenerating a clock signal, from the output of the limiter circuit, comprising:
   (a) an output at which the clock signal is provided;
   (b) a slope detector having first and second inputs and an output;
   (c) a phase comparator having a first input coupled to the output of the slope detector, a second input, and an output;
   (d) a voltage-controlled oscillator having a control input coupled to the output of the phase comparator and an output coupled both to the second input of the phase comparator and to the input of the unit for regenerating a clock signal;
   (e) an input coupled between the output of the limiter circuit to the first input of the slope detector;
   (f) delay means coupled between the input of the unit for regenerating a clock signal and the second input of the slope detector.

18. A device as claimed in claim 17, wherein
   the voltage-controlled oscillator comprises an inverting amplifier and an LC circuit; and the output of the slope detector is coupled to the LC circuit via a second impedance.

19. A device as claimed in claim 18, wherein the second impedance comprises a series arrangement of a resistor and a capacitor.

20. The device of claim 1 wherein
   a. the integrating element comprises a series arrangement of a resistor and a capacitor; and
   further comprising:
   b. a unit for regenerating a clock signal, from the output of the limiter circuit, comprising:
      (i) an output at which the clock signal is provided;
      (ii) a slope detector having first and second inputs and an output;

(iii) a phase comparator having a first input coupled to the output of the slope detector, a second input, and an output;

(iv) a voltage-controlled oscillator having a control input coupled to the output of the phase comparator and an output coupled both to the second input of the phase comparator and to the input of the unit for regenerating a clock signal;

(v) an input coupled between the output of the limiter circuit to the first input of the slope detector;

(vi) delay means coupled between the input of the unit for regenerating a clock signal and the second input of the slope detector; and (vii) a series arrangement of a capacitor and a second clipper circuit coupled between the second input of the slope detector and the second point of common potential.

21. A device as claimed in claim 10, wherein the second clipper circuit comprises two diode means arranged in anti-parallel.

22. A device as claimed in claim 21, wherein at least one of the diode means comprises a diode.

23. The device of claim 21 wherein at least one of the diode means comprises a plurality of series connected diodes.